US008783516B2

(12) United States Patent
Baak et al.

(10) Patent No.: US 8,783,516 B2
(45) Date of Patent: Jul. 22, 2014

(54) LIQUID DISPENSER AND METHOD FOR PREVENTING LIQUID SEGREGATION

(75) Inventors: Mark Baak, Lisse (NL); Bas Peeters, Sassenheim (NL); Marcus Johannes Voskuil, Oegstgeest (NL); Marcel Engels, Voorhout (NL)

(73) Assignee: Fluid Management Operations LLC, Wheeling, IL (US)

( * ) Notice: Subject to any disclaimer, the term of this patent is extended or adjusted under 35 U.S.C. 154(b) by 376 days.

(21) Appl. No.: 13/073,252

(22) Filed: Mar. 28, 2011

(65) Prior Publication Data

US 2012/0248137 A1    Oct. 4, 2012

(51) Int. Cl.
*B67D 7/06*  (2010.01)
*B65D 88/54*  (2006.01)
*G01F 11/00*  (2006.01)

(52) U.S. Cl.
USPC .................... 222/144.5; 222/318; 222/233

(58) Field of Classification Search
USPC ............ 222/144.5, 318, 1, 135, 132, 144, 63, 222/23, 233
See application file for complete search history.

(56) References Cited

U.S. PATENT DOCUMENTS

| 2,787,402 A * | 4/1957 | Stiner et al. ..................... 222/23 |
| 2007/0138203 A1* | 6/2007 | Sacchet ......................... 222/144 |
| 2007/0289991 A1* | 12/2007 | Jensen ............................. 222/1 |
| 2008/0234860 A1* | 9/2008 | Bartholomew et al. ........ 700/239 |
| 2009/0236367 A1* | 9/2009 | Voskuil et al. ................. 222/144 |
| 2010/0206902 A1* | 8/2010 | Engels et al. .................. 222/135 |

* cited by examiner

*Primary Examiner* — Frederick C Nicolas
*Assistant Examiner* — Stephanie E Williams
(74) *Attorney, Agent, or Firm* — Miller, Matthias & Hull LLP

(57) ABSTRACT

An apparatus for selectively dispensing liquids, such as paint colorants. The apparatus comprises container assemblies with a container and a pump. A pump conduit connects the pump to a valve assembly. A recirculation conduit connects the container to the valve assembly bypassing the pump. The valve assembly is configured to be switched between a dispensing position and a recirculation position closing off the dispense conduit. Method of preventing segregation of a multiphase liquid in a pump conduit between a container and a dispense conduit. A valve assembly between the pump conduit and the dispense conduit closes off the dispense conduit while it opens a recirculation conduit between the container and the valve assembly. The liquid is circulated via a circuit formed by the container, the pump conduit, the valve assembly and the recirculation unit.

13 Claims, 4 Drawing Sheets

LIQUID DISPENSER AND METHOD FOR PREVENTING LIQUID SEGREGATION

BACKGROUND

1. Technical Field

An apparatus is disclosed for selectively dispensing one or more of a plurality of liquids, in particular multiphase liquids. The multi-phase liquids can for instance be emulsions or dispersions containing solid particles, such as paints, pigment pastes, colorants, dyes, inks, and cosmetics. The disclosure also pertains to a method of preventing segregation of a multiphase liquid in a pump conduit of such an apparatus.

2. Background of the Related Art

As explained in US 2002/0195462, one fairly widespread type of dispensing machine comprises multiple reservoirs for colorant fluids, connected to a dispensing circuit. Each fluid product is drawn from its respective reservoir by a positive-displacement pump and delivered to a corresponding three-way two-position distributing valve. When the valve is in an inactive position, the fluid is returned to its respective reservoir through a recirculation duct. When it is necessary to dispense a pre-set amount of fluid, the valve is set to an active position so as to deliver the fluid from the reservoir to a dispensing nozzle.

US 2002/0195462 discloses a dispensing unit for a fluid dispensing machine comprising at least an inlet duct and an outlet duct for fluid products, connected to a variable-volume pumping chamber comprising at least one flexible wall. Two non-return valves mounted in counter-phase are located in the inlet and outlet ducts, respectively.

WO 2004/013036 relates to a circuit for dispensing fluids, in particular dyes, inks, paints and the like, which comprises pump means including a variable-volume chamber with at least one flexible wall. The pump means communicate with an output duct for dispensing the fluids. Two one-way valves are mounted in series in the output duct.

EP 1 908 510 A2 discloses a device for dosage of fluids comprising a colour circuit (numeral 1 in FIG. 1) a storage tank (2), "inside which a given base paint or colorant is contained, . . . . Departing from the storage tank is an intake pipe 3, which connects the storage tank 2 to the intake of a pump 4. The delivery of the pump 4 in turn traverses a delivery pipe 5 and reaches a three-way valve 6 electrically controlled by the automatic managing system (not shown). The function of the three-way valve 6 is that of dividing the flow that reaches the pump 4 between a dosage line 7 and a recirculation line 8, in this way guaranteeing the constancy of the flow that traverses the valve 6. In fact, if the needs of formulation require the flow directed to the dosage line 7 (and through this to the mixing container 9) to be smaller than the flow of the delivery of the pump 4, the three-way valve 6 directs the flow in excess to the recirculation line 8 and, through this, to the storage tank 2."

Systems for simultaneously dispensing a plurality of different liquids typically have long conduits, e.g. flexible plastic tubes, between the pumps and a manifold where the liquids are actually dispensed. Some liquids, such as colorants containing high density pigments or particles or instable binder/solvent solutions and/or emulsions, that remain in the conduits for prolonged periods, e.g. when the dispenser is not used during weekends or when a particular liquid is dispensed infrequently, may segregate, eventually forming a sediment or liquid phase and/or resulting in changes in properties. Segregation is prevented or at least reduced when the liquid is recirculated.

It is an object of the present invention to provide a relatively low cost and compact system for recirculation of the liquids in dispensers.

SUMMARY OF THE DISCLOSURE

An apparatus is disclosed for selectively dispensing one or more of a plurality of liquids, the apparatus comprising a plurality of container assemblies comprising:
 a container;
 a pump connected to the container;
 a valve assembly;
 a pump conduit connecting the pump to the valve assembly;
 a recirculation conduit connecting the container to the valve assembly;
 a dispense conduit connected to the valve assembly;
 wherein the valve assembly is configured to be switched between a dispensing position and a recirculation position closing off the dispense conduit.

The valve assembly can close off the dispensing conduit while the recirculation conduit is opened. When liquid needs to be dispensed from a container assembly, the valve assembly is actuated to open the dispense conduit and the pump is actuated to pump the liquid from the container to the dispense conduit. When no liquid needs to be dispensed from the container assembly, the valve assembly can be actuated to open the recirculation conduit and the pump is actuated to circulate the liquid within the circuit formed by the container, the recirculation conduit, the valve assembly and the pump conduit. The liquid can, e.g., be circulated intermittently to prevent segregation of the liquids constituents.

The pump can for instance be a bidirectional pump, capable of pumping the liquid from the container to the valve assembly and in reverse direction, i.e., from the valve assembly back to the container. The pump can for instance be a positive displacement pump.

The dispense conduit typically comprises a dispense opening or is connected to an element comprising a dispense opening, such as a manifold comprising a plurality of such openings.

The valve assembly can for instance comprise a three-way valve, such as a disc valve or a ball valve. Such as disc valve may for instance comprise a housing with a cavity divided by a disc into an upper inlet chamber at one side of the disk and two separate outlet chambers at the other side of the disk, the disk having an eccentric flow-through opening which can selectively be rotated between a dispensing position providing an open connection between the inlet chamber to the dispensing conduit via a first outlet chamber, and a second position providing an open connection between the inlet chamber to the recirculation conduit via a second outlet chamber.

Such three way valves can for instance be coaxially arranged in stacked valve housings. This way, the valve assemblies can be stacked to form a block. Such stacking of valve housings to form a block can also be used with valve assemblies which do not close off the dispense conduit during recirculation.

To simplify use of the apparatus, the three way valves can bee operatively connected to a common actuator. The common actuator can for example be a driving axle extending through the three-way valves. Alternatively, or additionally, the valve assemblies can be configured to actuate an adjacent three-way valve. This way, the valve assemblies actuate each other in a serial manner when the first in a row is actuated by a user. For ease of the user, the container assemblies can be provided with a position indicator.

In stead of using three-way valves, the valve assembly can also be a suitably coordinated arrangement of one-way valves, e.g., a one way valve in the recirculation conduit combined with a downstream provision for stopping flow through the dispense conduit. To allow easy cleaning and liquid refill the container of the container assembly may for instance comprise a flexible bag for the liquid.

Optionally, the apparatus can for instance comprises a controller arranged to register the time that has lapsed after dispensing. Such a controller can be arranged to initiate recirculation when said time exceeds a pre-selected threshold.

To reduce the risk of segregation downstream the valve assembly, the length of the dispense conduit between the valve assembly and the dispense opening can for instance be less than 30 centimeters, e.g., less than 20 centimeters.

A recirculation conduit is particularly useful for liquids that are prone to segregate, such as colorants containing high density pigments or particles or instable binder/solvent solutions and/or emulsions (syneresis).

The number of container assemblies as described above can be tailored to a specific application or to a specific combination of liquids. The apparatus may comprise assemblies similar to the assemblies as described above but without a recirculation conduit, thus achieving a simpler configuration of the apparatus.

The disclosure also pertains to a method of preventing segregation of a multiphase liquid in a pump conduit between a container and a dispense conduit. A valve assembly between the pump conduit and the dispense conduit closes off the dispense conduit while it opens a recirculation conduit between the container and the valve assembly. The liquid is then pumped to circulate, e.g., intermittently, via a circuit formed by the container, the pump conduit, the valve assembly and the recirculation unit. The liquid can for instance be circulated in a direction opposite to a flow direction during dispensing.

BRIEF DESCRIPTION OF THE DRAWINGS

The disclosed assembly and apparatus will be further explained with reference to the accompanying drawings in which a presently preferred embodiment of the invention is shown schematically.

It is noted that the drawings are not necessarily to scale and that details, which are not necessary for understanding the present invention, may have been omitted.

DETAILED DESCRIPTION OF THE PRESENTLY PREFERRED EMBODIMENTS

Figure 1:
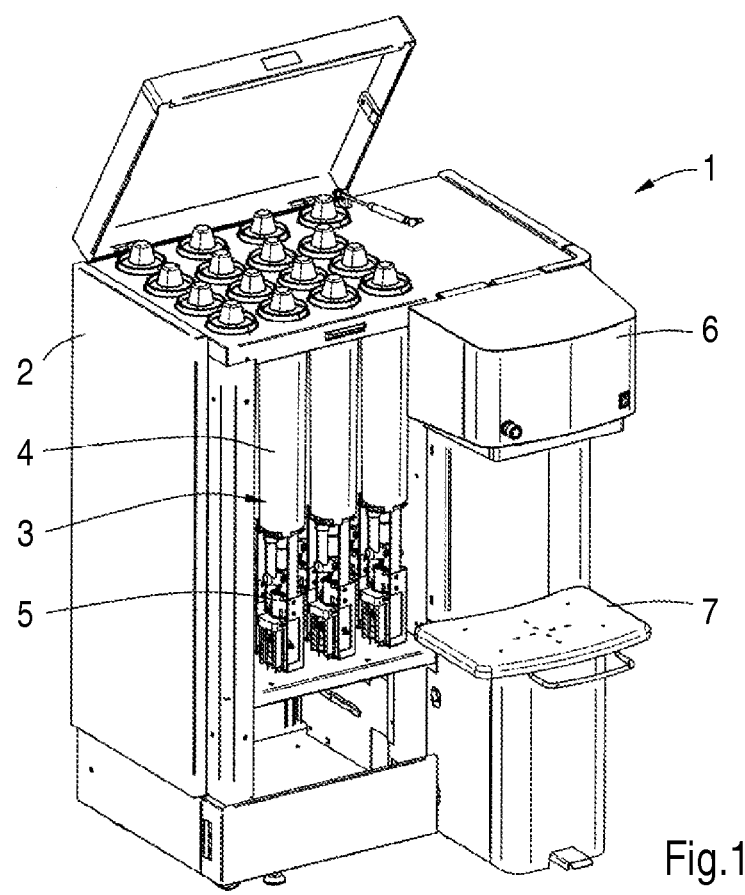
FIG. 1 is a perspective view of a disclosed apparatus for dispensing liquids.

FIG. 1 illustrates an embodiment of an apparatus 1 for dispensing liquids, such as colorants for paints. This particular embodiment includes a cabinet 2 accommodating a plurality of container assemblies 3 comprising a container 4 and a pump 5. The apparatus 1 further comprises a dispense head 6, a support 7 for a container located below the dispense head 6 and optionally provided with a weighing device, and electronic equipment (not shown) for driving the components of the apparatus 1. The dispense head 6 in turn comprises a manifold (hidden from view; known in itself) for dispensing a plurality of liquids.

Figure 2B:
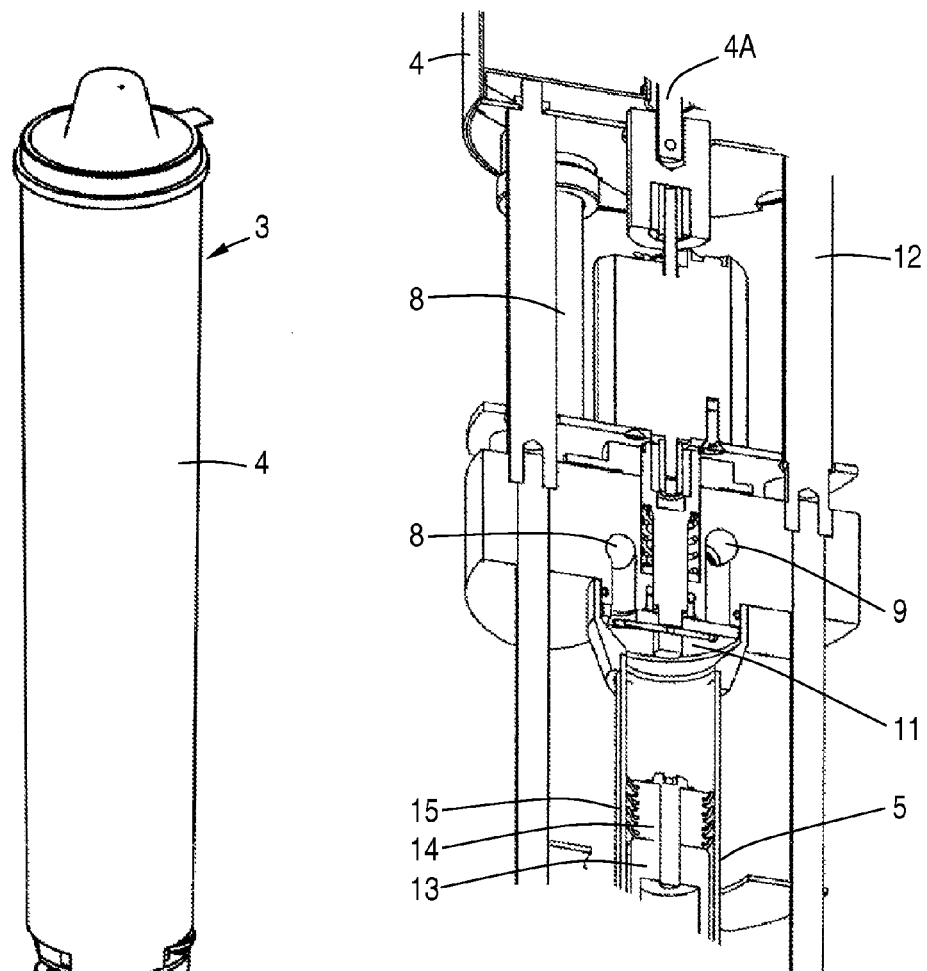
FIGS. 2A and 2B are a perspective view and a cross-sectional view, respectively, of an assembly comprising a container and a pump as used in the apparatus of FIG. 1.
Figure 2A:
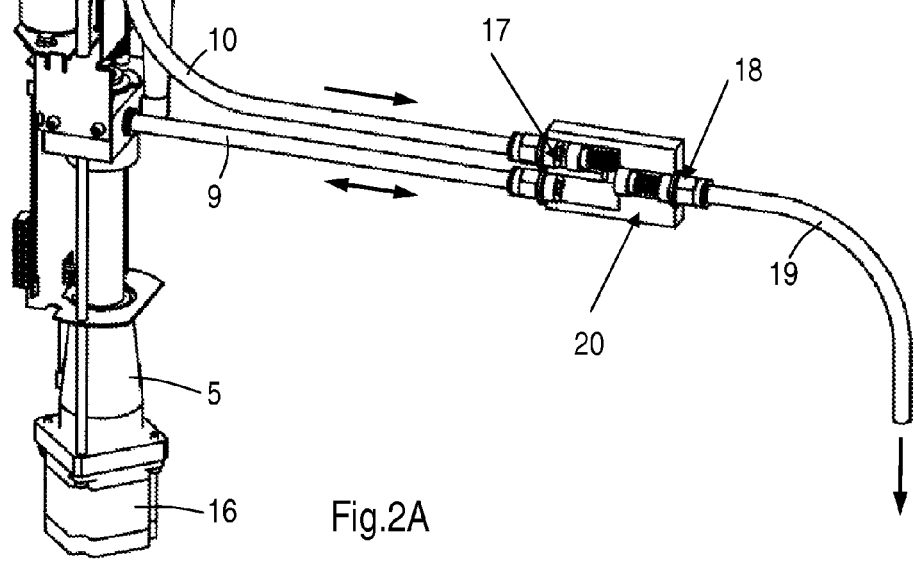

FIG. 2A shows a container assembly 3 as used in the apparatus 1 of FIG. 1. The container assembly 3 comprises a container 4, in turn comprising a stirrer 4A (FIG. 2B), rotatably mounted inside the container 4, and connected via a rigid conduit 8 to a piston pump 5. The assembly 3 further comprises a pump conduit 9 connected to the pump 5 and a recirculation conduit 10 connected to the pump conduit 9 and to the container 4.

As shown in more detail in FIG. 2B, in this example, the pump 5 comprises a disc-valve 11 operated by an electric motor 12 to selectively connect the pump 5 to the container 4 or to the pump conduit 9. The pump 5 comprises a piston rod 13 provided on one end with a piston 14, disposed within a cylinder 15. The other end of the piston rod 13 comprises a threaded opening which cooperates with a spindle (not shown), which in turn is connected to or part of an electric motor 16 (FIG. 2A). By driving the electric motor 16 in a first direction, the piston rod 13 and the piston 14 are moved away from the valve 11 to draw in material from the container 4 or from the pump conduit 9, depending on the position of the valve 11. By driving the electric motor 16 in the opposite direction, the piston rod 13 and the piston 14 are moved towards the valve 11 to expel the material to the pump conduit 9 or back to the container 4, again depending on the position of the valve 11. Thus, the pump 5 is capable of pumping the liquid from the container to the dispense conduit and in reverse direction.

In the exemplary embodiment of FIGS. 2A-B the recirculation conduit 10 comprises a first one-way valve 17 connecting it to the pump conduit 9, whereas the pump conduit 9 comprises a second one-way valve 18 downstream from the first one-way valve 17, connecting the pump conduit 9 to a dispense conduit 19. Both one-way valves 17, 18 open when liquid in the respective conduit 9, 10 is pumped in a direction away from the container 4. In this example, the first and second one-way valves 17, 18 and the connection of the recirculation conduit 10 to the dispense conduit 9 are integrated in a common housing 20.

When liquid is withdrawn from the container 4 and pumped through the pump conduit 9, the second one-way valve 18 opens and the liquid is dispensed via the dispense conduit 19 to the dispense head 6. When the liquid is subsequently pumped in reverse direction, the second one-way valve 18 closes, the first one-way valve 17 opens, and liquid is withdrawn from the container 4 through the recirculation conduit 10. Thus, the first and second one-way valves 17, 18 are controlled and recirculation is established by reversing the flow direction of the liquid, without the need for a motor or actuator.

In a refinement, the housing 20 may comprise a structure, such as a key way on one side of the housing and a corresponding key on the other side, which enables it to be attached to an identical housing. Thus, a plurality of housing can be grouped in one or more blocks.

Figure 3A:
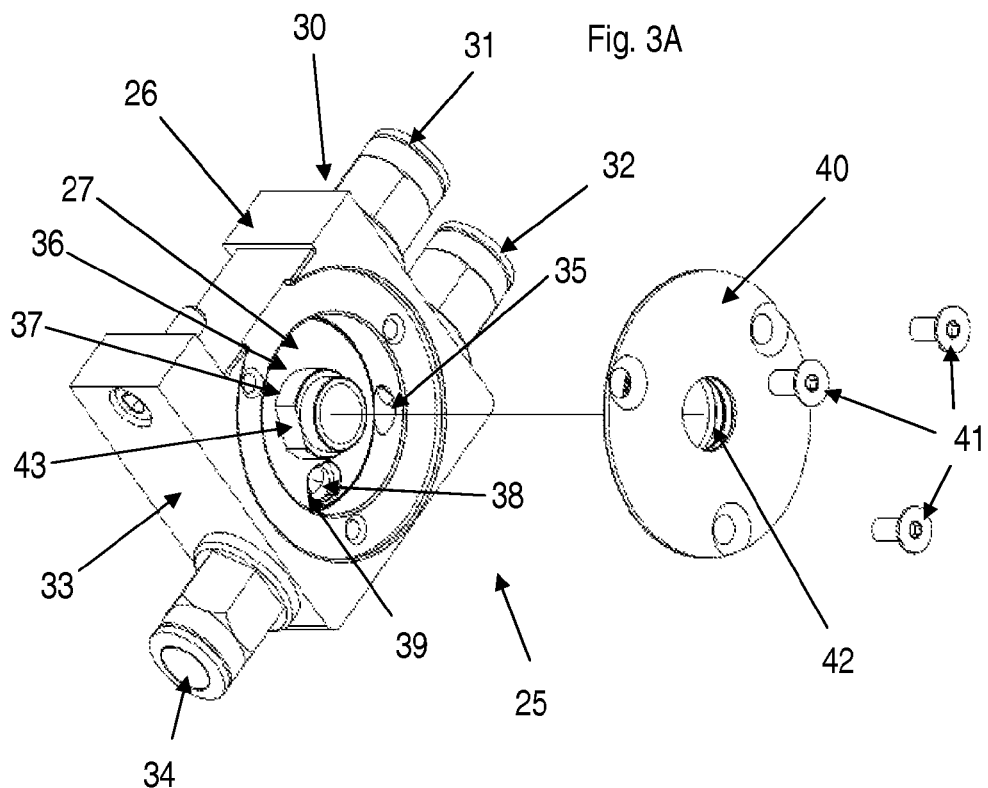
FIGS. 3A and 3B are exploded views of a three way valve for use in the disclosed apparatus.
Figure 4:
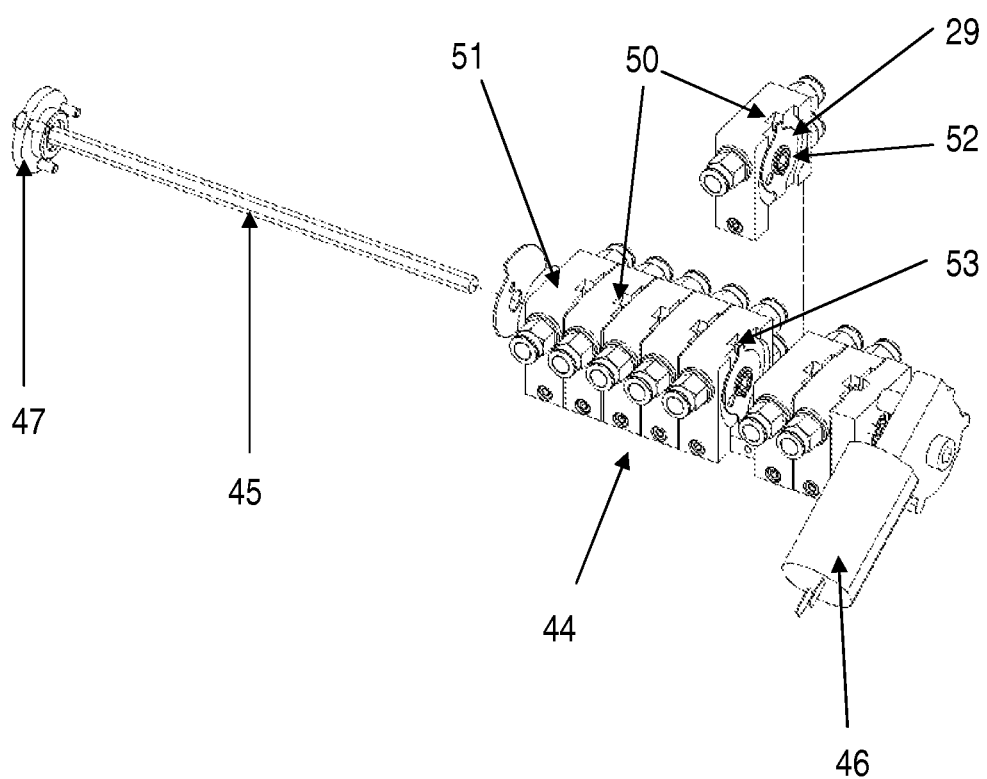
FIG. 4 is a block of stacked three way valves of the type shown in FIGS. 3A and 3B.

FIGS. 3A and B show an alternative embodiment of a valve assembly 25 for a dispenser according to the present disclosure. The valve assembly 25 comprises a housing 26 with a circular cavity 27 at one side with an open end and a closed bottom, and a circular recess 29 at the opposite side (FIG. 4). The housing 25 comprises a back side 30 with a connection 31 to the pump conduit 9 and a connection 32 to the recirculation conduit 10. The housing 25 further comprises a front side 33 with a connection 34 to the dispense conduit 19 leading to the dispense head 6. Each of the three connections 31, 32, 34 opens into an eccentric smaller opening 35 in the housing wall, which leads to the cavity 27. The smaller opening 35 of the connection 31 for pump conduit 9 is in register with the upper half of the connection 31. The smaller openings of the other two connections (not shown) are in register with the lower halves of the corresponding connections 32, 34.

The cavity in the housing contains a disk 36 with a central non-circular (e.g., hexagonal) opening 37 and an eccentric flow-through opening 38. The disk 36 divides the cavity 27 into an upper part with an inlet chamber 39 in open connection with the pump conduit 9, and a lower part. The lower part comprises a first outlet chamber (not shown) in open connection with the dispense conduit 19 and a second outlet chamber (not shown) in open connection with the recirculation unit 10. The first and second outlet chambers are separated by an internal wall (not shown).

Figure 3B:
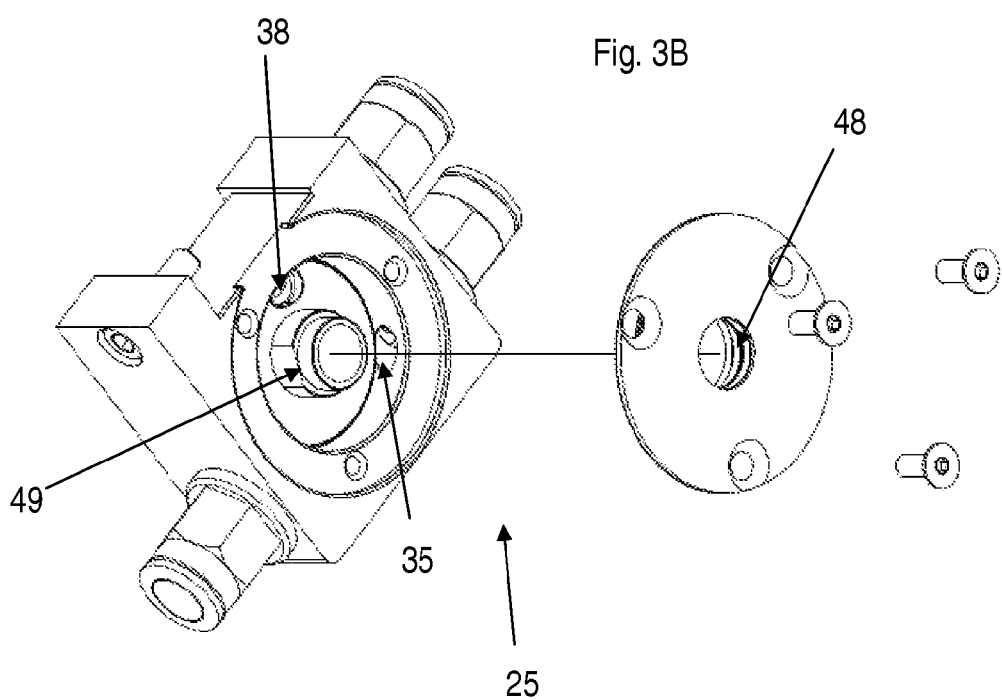

The disk 36 can be rotated between a dispense position (FIG. 3A) and a recirculation position (FIG. 3B). In the dispense position the disk 36 opens a flow path from the inlet chamber 39 via the flow through opening 38 and the first outlet chamber to the connection 34 of the dispense conduit 19. In the recirculation position the disk 36 closes off the first outlet chamber and opens a flow path from the inlet chamber 39 via the flow through opening 38 and the second outlet chamber to the connection 32 of the recirculation conduit 10.

The open side of the cavity 27 is closed off by a circular lid 40 which is attached to the housing by fastening means 41. The lid 40 is provided with a circular central opening 42, which is in register with the non-circular central opening 37 in the disk 36 and a central circular opening (no shown) in the bottom of the housing. A bus 43 extends coaxially with the openings 37, 42 between the disk 36 and the lid 40. The bus 43 is pressed onto the disk 36 by means of a spring 48 acting onto a shoulder 49 of the bus 43. Sealing rings (not shown) are used to obtain a leak tight arrangement.

When the valve assemblies 25 are stacked and coupled to form a block 44, as shown in FIG. 4, the openings 37, 42 in the lids 40, disks 36 and housing bottoms are in line. A drive axle 45 extends through the openings 37, 42 to form a common actuator clamping the block 44 of stacked valve assembly housings between a motor 46 at one end and an end plate 47 at the opposite end. The drive axle 45 has a non-circular contour matching in size and shape with the contour of the opening 37 in the disk 36. The motor 46 rotates the driving axle 45. The disks 36 of all valve assemblies 25 in the block 44 are rotated with the driving axle 45 and are simultaneously switched between the dispensing position and the recirculation position. In the dispensing position, only those pumps 5 are activated which are associated with the container assemblies containing selected liquid(s). Pumps 5 of other container assemblies 3 remain inactive. As a result, these container assemblies 3 do not dispense liquids even though the associated valve assembly 25 is in a dispensing position.

The circular recess 29 at the housing side opposite to the cavity 27 comprises an extension 50 interrupting the upper face 51 of the housing. An indicator disk 52 is rotatable within the recess 29. The indicator disk 52 comprises a projection 53 projecting through the recess 50 interrupting the housing upper face 53. The indicator disk 52 is fixed to the drive axle 45. As a result, the indicator disk 52 rotates with the drive axle 45 and the valve disks 36. This way, the position of the indicator projection 53 informs a user whether the valve disks 36 are in the dispensing position or in the recirculation position.

As a matter of course, the invention is not restricted to the above-disclosed embodiment and can be varied in numerous ways within the scope of the claims.

What is claimed:

1. An apparatus for selectively dispensing one or more of a plurality of liquids, the apparatus comprising a plurality of container assemblies, wherein each of the container assemblies comprises:
   a container;
   a pump operatively connected to the container;
   a valve assembly;
   a pump conduit connecting the pump to the valve assembly;
   a recirculation conduit connecting the container to the valve assembly bypassing the pump; and
   a dispense conduit connected to the valve assembly;
   wherein each of the valve assemblies of each of the container assemblies is configured to be switched between a dispensing position and a recirculation position by a common actuator thereby closing off the respective dispense conduits;
   wherein the common actuator is a driving axle extending through the valve assemblies.

2. The apparatus of claim 1, wherein each of the pumps is a bidirectional pump.

3. The apparatus of claim 1, wherein in at least one of the container assemblies the pump is a positive displacement pump.

4. The apparatus of claim 1, wherein at least some of the valve assemblies comprise a three-way valve.

5. The apparatus of claim 4, wherein the three way valves are disc valves.

6. The apparatus of claim 4, wherein at least some of the three way valves are arranged in stacked valve housings.

7. An apparatus for selectively dispensing one or more of a plurality of liquids, the apparatus comprising a plurality of container assemblies, wherein each of the container assemblies comprises:
   a container;
   a pump operatively connected to the container;
   a valve assembly;
   a pump conduit connecting the pump to the valve assembly;
   a recirculation conduit connecting the container to the valve assembly bypassing the bump; and
   a dispense conduit connected to the valve assembly;
   wherein each of the valve assemblies of each of the container assemblies is configured to be switched between a dispensing position and a recirculation position by a common actuator thereby closing off the respective dispense conduits; and
   wherein at least some of the valve assemblies are configured to actuate an adjacent valve assembly.

8. The apparatus according to claim 1, wherein in at least some of the valve assemblies are provided with a position indicator visually indicating whether the valve assembly is in the dispensing position or in the recirculation position.

9. An apparatus for selectively dispensing one or more of a plurality of liquids, the apparatus comprising a plurality of container assemblies, wherein each of the container assemblies comprises:
   a container;
   a pump operatively connected to the container;
   a valve assembly;
   a pump conduit connecting the pump to the valve assembly;

a recirculation conduit connecting the container to the valve assembly bypassing the bump; and a dispense conduit connected to the valve assembly;

wherein each of the valve assemblies of each of the container assemblies is configured to be switched between a dispensing position and a recirculation position by a common actuator thereby closing off the respective dispense conduits; and wherein the dispense conduits are connected to a common manifold for simultaneously dispensing a plurality of liquids.

10. The apparatus according to claim 1, comprising a controller for operating the pumps and valve assemblies, the controller being arranged to register the time that has lapsed after a dispensing cycle and to initiate recirculation when said time exceeds a pre-selected threshold.

11. A method of preventing segregation of multiphase liquids in pump conduits, each of which are disposed between a separate container and a separate dispense conduit, the method comprising:

providing a valve assembly between each pump conduit and each dispense conduit;

providing a recirculation conduit between each valve assembly and each container;

coupling a common actuator to each valve assembly, wherein the common actuator is a driving axle extending through the valve assemblies;

isolating each dispense conduit and providing communication between each pump conduit and each recirculation conduit by shifting each valve assembly to a recirculation position with the common actuator;

pumping the liquids to recirculate the liquids via circuits formed by each container, pump conduit, valve assembly and recirculation conduit.

12. The method according to claim 11, wherein the pumping of the liquids to recirculate the liquids is repeated intermittently.

13. The method according to claim 11, wherein the liquids are recirculated in a direction opposite to a flow direction during dispensing.

* * * * *